(12) United States Patent
Curtiss

(10) Patent No.: US 8,408,605 B2
(45) Date of Patent: Apr. 2, 2013

(54) HAMMER UNION LOCK AND RELATED METHODS

(75) Inventor: Jason Post Curtiss, Houston, TX (US)

(73) Assignee: Diamond Offshore Drilling, Inc., Houston, TX (US)

(*) Notice: Subject to any disclaimer, the term of this patent is extended or adjusted under 35 U.S.C. 154(b) by 53 days.

(21) Appl. No.: 13/209,723

(22) Filed: Aug. 15, 2011

(65) Prior Publication Data

US 2012/0038146 A1   Feb. 16, 2012

Related U.S. Application Data

(60) Provisional application No. 61/374,121, filed on Aug. 16, 2010.

(51) Int. Cl.
*F16L 37/26* (2006.01)

(52) U.S. Cl. ............ 285/327; 285/39; 285/92; 285/389; 285/386; 29/237

(58) Field of Classification Search .................. 285/39, 285/92, 327, 325, 389, 386; 29/237
See application file for complete search history.

(56) References Cited

U.S. PATENT DOCUMENTS

| | | | | |
|---|---|---|---|---|
| 1,969,531 A | * | 8/1934 | Swedler et al. | 285/92 |
| 2,067,773 A | * | 1/1937 | Long | 285/39 |
| 2,568,232 A | * | 9/1951 | Hamer | 285/39 |
| 2,893,756 A | * | 7/1959 | Sundstrom | 285/92 |
| 2,902,297 A | * | 9/1959 | Cowan | 285/327 |
| 3,233,921 A | * | 2/1966 | Holmgren et al. | 285/92 |
| 4,501,521 A | | 2/1985 | Geczy | |
| 4,580,788 A | * | 4/1986 | Rabe et al. | 285/389 |
| 4,919,456 A | * | 4/1990 | Wong | 285/39 |
| 4,927,187 A | * | 5/1990 | Sanford et al. | 285/92 |
| 5,016,920 A | * | 5/1991 | Anderson | 285/39 |
| 5,094,491 A | * | 3/1992 | Berghammer et al. | 285/92 |
| 5,374,085 A | | 12/1994 | Beatrice et al. | |
| 6,139,068 A | | 10/2000 | Burress et al. | |
| 7,201,404 B1 | | 4/2007 | Kronmeyer | |
| 7,258,372 B2 | | 8/2007 | Kronmeyer | |

\* cited by examiner

*Primary Examiner* — David E Bochna
(74) *Attorney, Agent, or Firm* — Osha Liang LLP

(57) ABSTRACT

A threaded union includes a threaded union nut configured to couple abutting ends of a threaded nipple on a distal end of a first joint and a shouldered nipple on a distal end of a second joint and a lower wedge and an upper wedge positioned within an offset distance formed between a lower surface of the union nut and an upper surface of an enlarged section of the shouldered nipple.

21 Claims, 9 Drawing Sheets

HAMMER UNION LOCK AND RELATED METHODS

CROSS REFERENCE TO RELATED APPLICATIONS

This application claims the priority of a provisional application under 35 U.S.C. §119(e), namely U.S. Patent Application Ser. No. 61/374,121 filed on Aug. 16, 2010, which is incorporated by reference in its entirety herein.

BACKGROUND

1. Field of the Disclosure

Embodiments disclosed herein relate generally to the use of threaded unions, particularly so-called "hammer unions." More specifically, the current disclosure relates to apparatus and method for locking threaded unions in a made-up condition, especially hammer unions subject to vibration or impacts, or which are located in inaccessible areas.

2. Background Art

Threaded unions, particularly "hammer" unions, are commonly used in petroleum exploration and production to join conduits together, for example, conduits carrying high-pressure fluids such as drilling mud, fracturing fluids, and oil and gas produced incidental to drilling activities. Hammer unions are generally considered to be economical, simple, reliable, and robust, and very easy to make-up and break-out quickly. Examples of hammer unions include, but are not limited to, the WECO® brand hammer unions available from FMC Technologies of Houston, Tex.

Typically, hammer unions are used in more temporary situations, such as joining together sections of joints (e.g., Chicksan® joints) used for pumping fracturing fluids into a wellbore under high pressure. In these applications, hammer unions rarely loosen (or "back-off") in service because the duration of the application is so short. However, hammer-unions may also be used in certain long-term applications for their ease of make-up and break-out, especially, for example, for equipment that may need to be replaced quickly and efficiently (e.g., rotary hoses for conveying drilling mud between a stand-pipe manifold and a rotary swivel or top drive, or components of a choke manifold, such as valves, chokes and spools, which may fail unexpectedly due to erosive flows). In these longer-term applications, there may be a need to ensure that the hammer union does not loosen during service.

Several locking mechanisms for threaded unions are described in the prior art, for example: U.S. Pat. No. 4,501,521, disclosing a castellated locking fastener assembly, U.S. Pat. No. 6,139,068, disclosing a union lock for maintaining a union between two conduits, and U.S. Pat. Nos. 7,258,372 and 7,201,404 (by the same inventor) disclosing a union nut with lock members. Locking mechanisms for quick-disconnect fittings are also known in the prior art, for example, U.S. Pat. No. 5,374,085, which discloses a mechanical locking device for use with conventional quick-disconnect fluid couplings.

Hammer unions typically include three major parts: a shouldered nipple, a union nut, and a threaded nipple. The hammer union is typically made-up and broken-out by applying a sledge hammer to radial lugs on the union nut. Refer now to FIG. 1A, a cross-sectional view of a conventionally made-up hammer union with a spherical metal-to-metal pressure seal is shown. Other types of pressure seals are possible, including those having elastomeric or composite seals, especially for (relatively) low working-pressure unions. Union nut 1 has hammer lugs 1A, internal threads 1B and flat surface 1C. Union nut 1 bears on shoulder 2A on a distal end of shouldered nipple 2, which also has sealing surface 2C and outer diameter 5. Threaded nipple 3 has external threads 3A and sealing surface 3B.

FIG. 1B shows a perspective view of a hammer union with an external shoulder, which in this example is a hose ferrule for attaching the union to high pressure flexible hose. The hammer union comprises union nut 1 with hammer lugs 1A and flat surface 1C, shouldered nipple 2, and threaded nipple 3. In this example, which is typical of many applications on drilling rigs, shouldered nipple 2 has an enlarged section 2D (in this example, a hose ferrule) with transition profile 2E and external shoulder 2F. Transition profile 2E may be a constant or variable radius fillet or a chamfer, or another profile known in the art. Below union nut 1, shouldered nipple 2 has outer diameter 5. In the made-up condition, union nut 1 is separated from shoulder 2F by offset distance 4, which is typically designed to allow union nut 1 to drop down, exposing sealing surface 2C of shouldered nipple 2 (shown in FIG. 1A) so that it may be cleaned and inspected.

Other prior-art hammer union configurations include a union nut separated by an offset distance from an external shoulder, including valve bodies, hydraulic wyes, crosses and manifolds. Still other prior-art hammer union configurations may include a union nut separated by an offset distance from a small external shoulder or groove, while other prior-art hammer union configurations may include a shouldered nipple with a constant external diameter, that is, without external shoulders or grooves. Accordingly, there exists a need for a locking mechanism for a threaded union in a made-up condition that may be quickly installed on existing threaded unions.

SUMMARY OF THE DISCLOSURE

In one aspect, embodiments disclosed herein relate to a threaded union including a threaded union nut configured to couple abutting ends of a threaded nipple on a distal end of a first joint and a shouldered nipple on a distal end of a second joint and a lower wedge and an upper wedge positioned within an offset distance formed between a lower surface of the union nut and an upper surface of an enlarged section of the shouldered nipple.

In other aspects, embodiments disclosed herein relate to a locking mechanism for a threaded union, the locking mechanism including a lower wedge and an upper wedge positioned within an offset distance formed between a lower surface of a union nut and an upper surface of an enlarged section of a shouldered nipple, and at least one mechanical fastener configured to urge the lower wedge and the upper wedge together, wherein the lower and upper wedges are urged together to create an axial force against the lower surface of the union nut and the upper surface of the enlarged section.

In other aspects, embodiments disclosed herein relate to a method to lock a union nut of a threaded union, the method including threading the union nut over abutting ends of a threaded nipple and a shouldered nipple, mating a lower wedge with an upper wedge within an offset distance formed between a lower surface of the union nut and an upper surface of an enlarged section of the shouldered nipple, urging the lower and upper wedges together, and generating axial forces against the lower surface of the union nut and the upper surface of the enlarged section of the shouldered nipple.

Other aspects and advantages of the invention will be apparent from the following description and the appended claims.

DETAILED DESCRIPTION

In one aspect, embodiments disclosed herein relate to a locking mechanism that may be installed onto a made-up threaded union to prevent the threaded union from loosening.

Figure 1A:
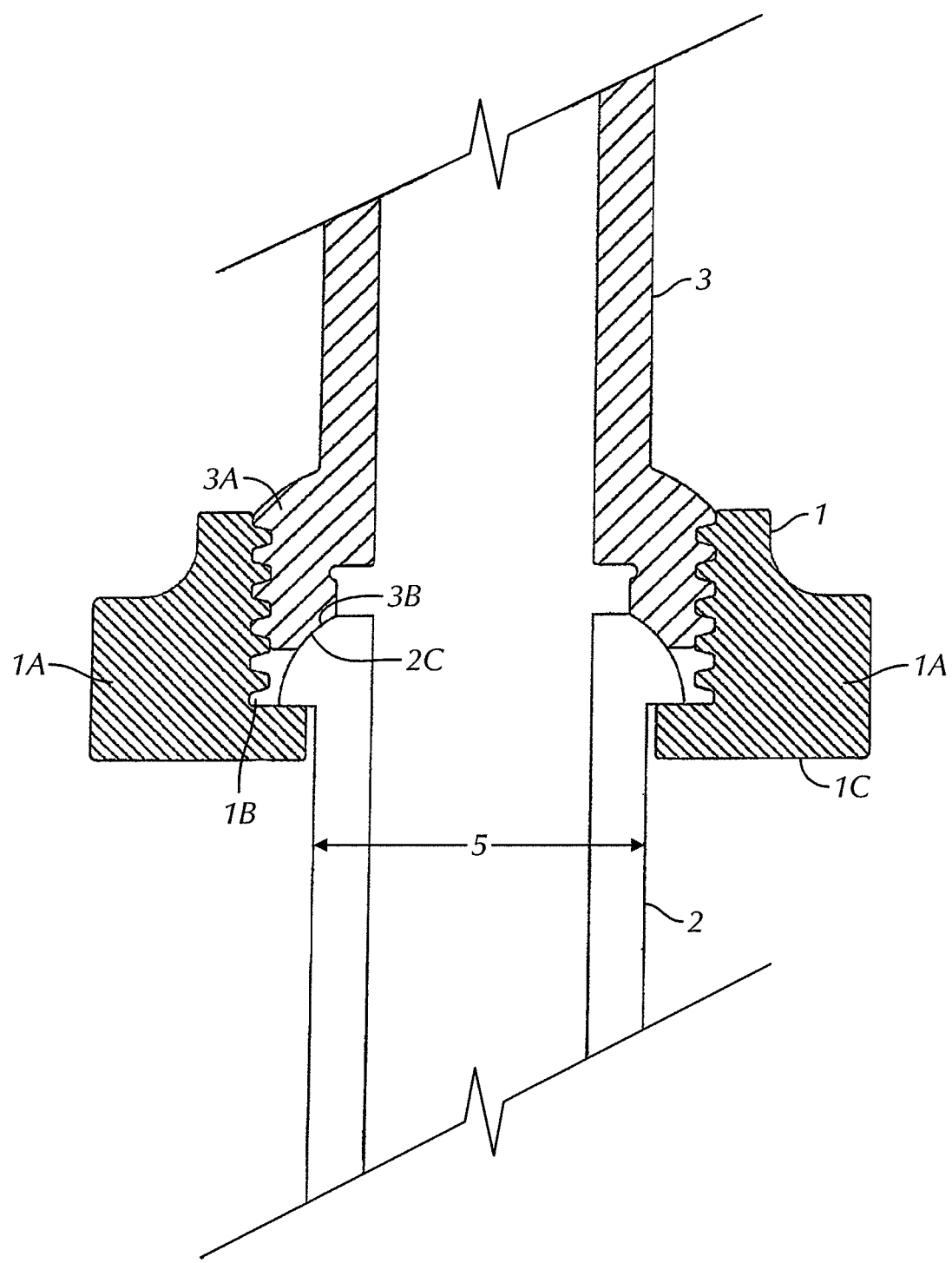
FIG. 1A shows a cross-sectional view of a conventional hammer union with a spherical metal-to-metal pressure seal.
Figure 1B:
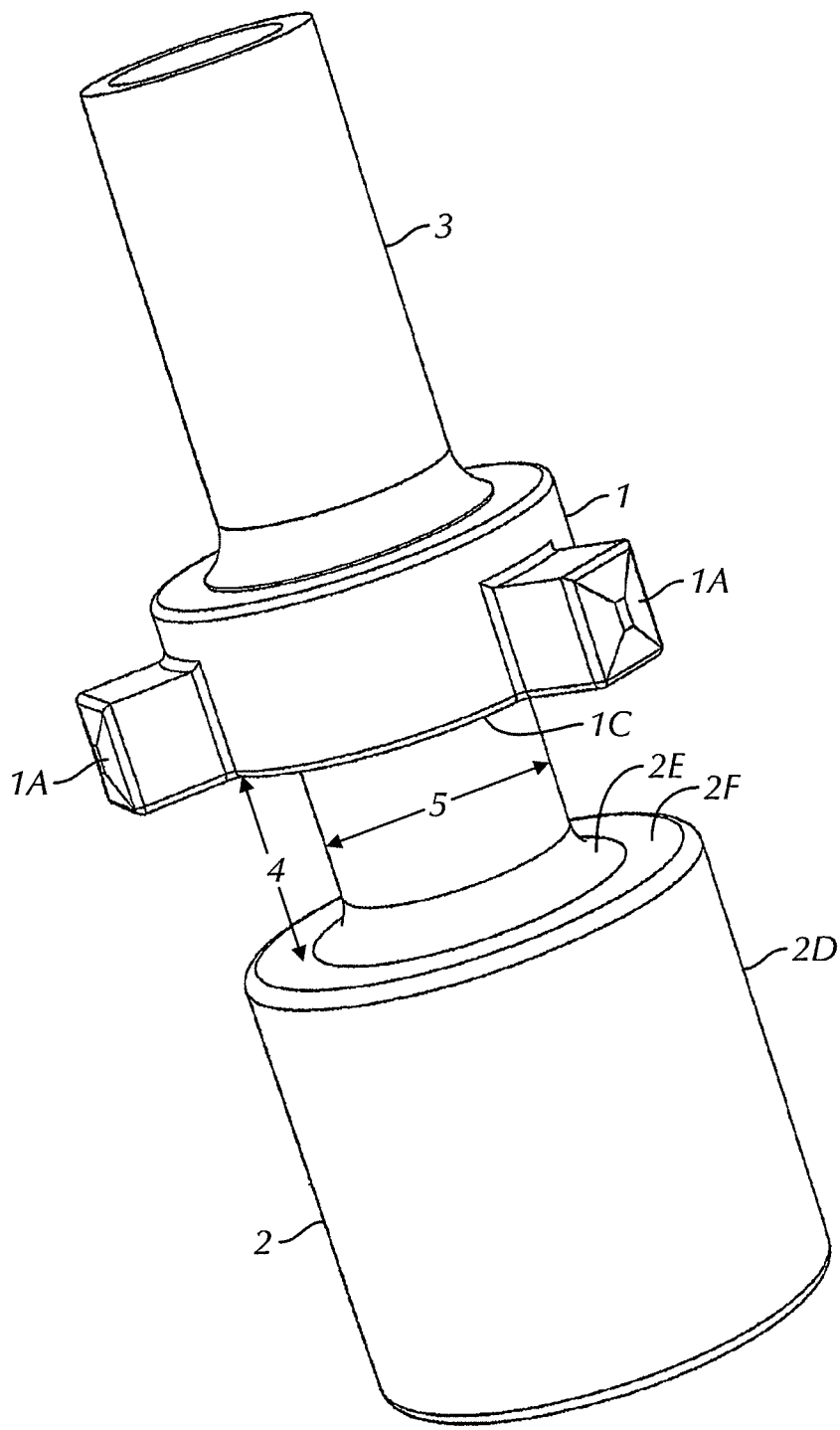
FIG. 1B shows a perspective view of a conventional hammer union with an external shoulder.
Figure 2A:
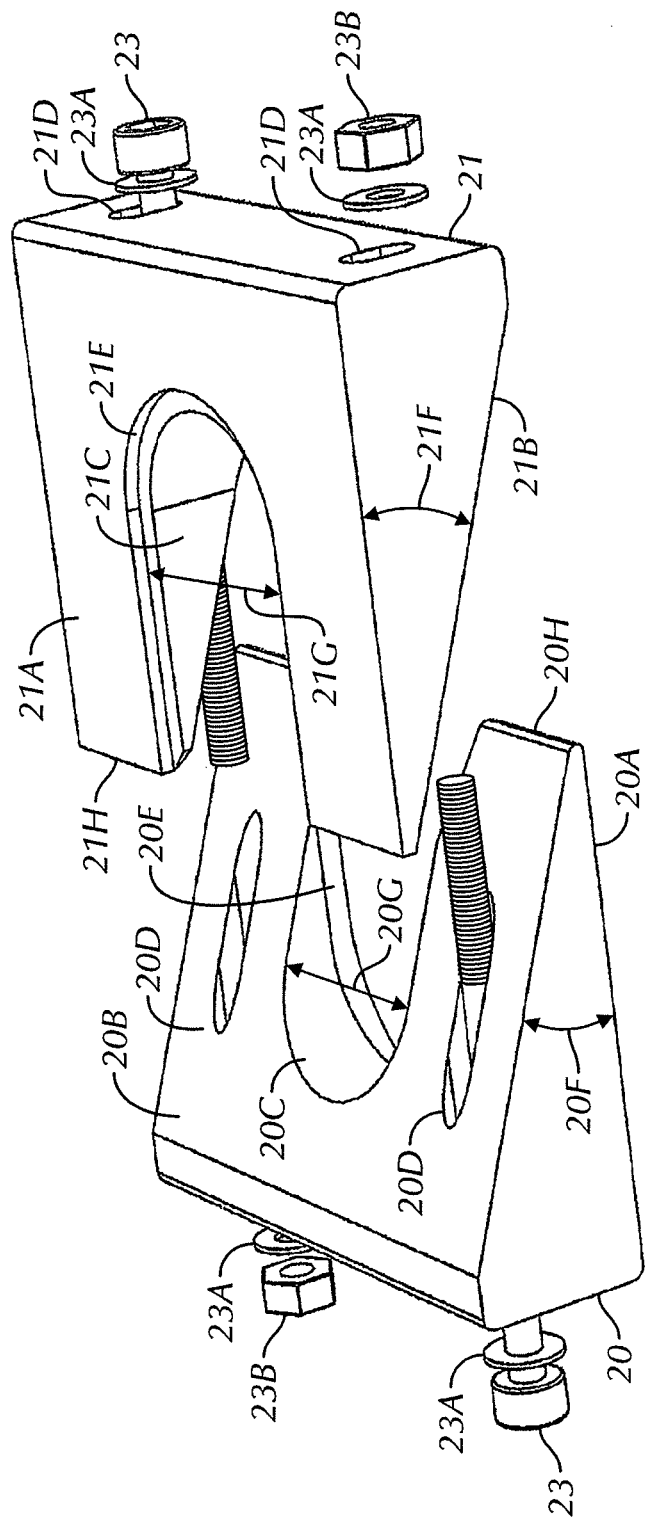
FIGS. 2A and 2B show exploded perspective views of a locking mechanism in accordance with one or more embodiments of the present disclosure.

Referring to FIG. 2A, an exploded perspective view a locking mechanism in accordance with one or more embodiments of the present disclosure is shown. The locking mechanism includes a lower wedge 20 having a horizontal surface 20A and inclined surface 20B, which are separated by wedge angle 20F. Lower wedge 20 may also have an elongated groove 20C with a groove width 20G, cut into a pointed end 20H of the lower wedge 20. Oval through-holes 20D may be substantially parallel to horizontal surface 20A. Elongated groove width 20G may be slightly larger than outer diameter 5 of the shouldered nipple 2 (shown in FIGS. 1A and 1B). Profiled edge 20E between elongated groove 20C and horizontal surface 20A is configured to fit transition profile 2E shown in FIG. 1B.

Further, the locking mechanism includes an upper wedge 21 having a horizontal surface 21A and an inclined surface 21B, which are separated by wedge angle 21F. Upper wedge 21 may also have an elongated groove 21C with a groove width 21G, cut into a pointed end 21H of the upper wedge 21. Elongated groove width 20G may be slightly larger than outer diameter 5 of the shouldered nipple 2. Profiled edge 21E between elongated groove 21C and horizontal surface 21A (like profiled edge 20E described above) is shown as a relieved or "rabbetted" edge configured to fit over a snap-ring (not shown), which is commonly fitted beneath union nut 1 in FIGS. 1A and 1B. While the lower wedge 20 and upper wedge 21 are shown substantially rectangular in a plan view, those skilled in the art will understand other shapes in which the lower and upper wedges 20, 21 may be configured as shown in plan view, for example, round.

Those having ordinary skill in the art will recognize that profiled edges 20E and 21E may have different profiles than shown in the figures, for example, to best conform to a particular transition profile. In certain embodiments, lower wedge 20 may have profiled edge 20E that is radiused to substantially match a particular transition profile, and upper wedge 21 may have profiled edge 21E hat is rabbetted. In other embodiments, only one of lower wedge 20 and upper wedge 21 may have a profiled edge. In yet further embodiments, neither lower wedge 20 nor upper wedge 21 may have a profiled edge.

Lower wedge 20 and upper wedge 21 may be mated at inclined surfaces 20B and 21B and urged together by mechanical threaded fasteners, such as hex headed cap screws 23, washers 23A and nuts 23B, passing through oval through-holes 20D and 21D. Those skilled in the art will appreciate other fasteners that may be used to urge together the lower wedge 20 and upper wedge 21, such as, for example, spherical nuts embedded in one wedge, or adjustable cam-type clamps in lieu of threaded fasteners.

Figure 2B:
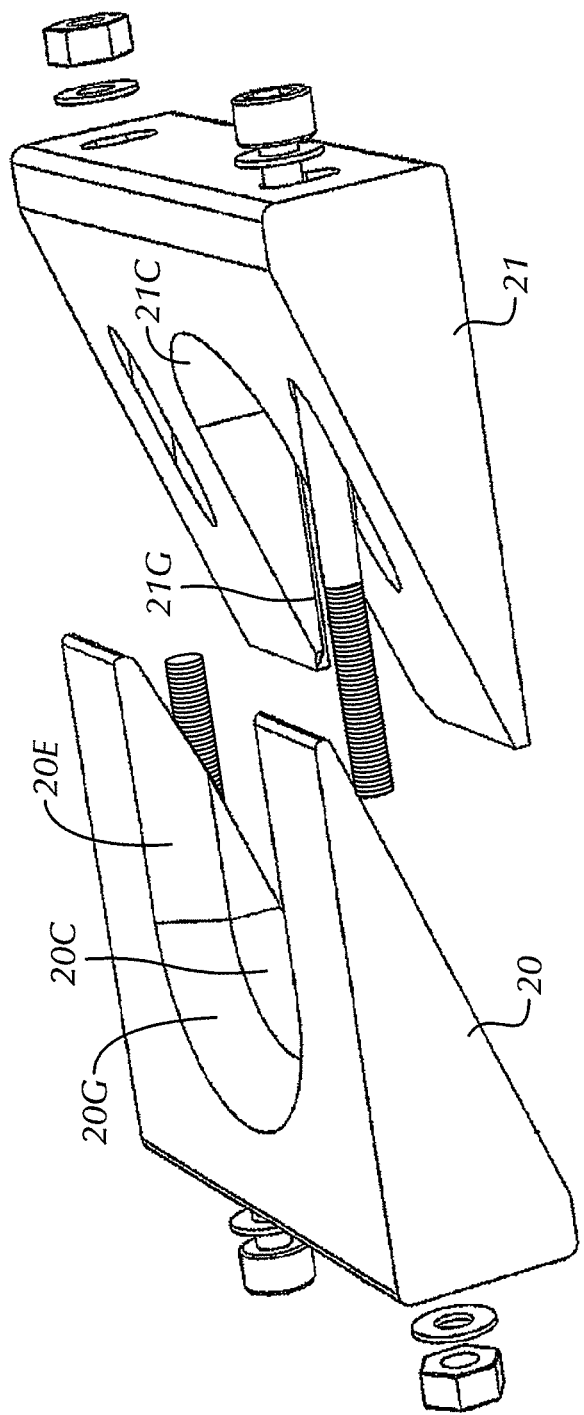

Wedge angles 20F and 21F may be substantially the same such that when the wedges are mated at inclined surfaces 20B and 21B, horizontal surfaces 20A and 21A may be substantially parallel. In certain embodiments, wedge angles 20F and 21F may be between about 15 and 21 degrees. In other embodiments, wedge angles 20F and 21F may be about 18 degrees. FIG. 2B shows the underside of the lower and upper wedges 20, 21 shown in FIG. 2A, more clearly showing elongated grove 20C and profiled edge 20E of lower wedge 20, and elongated groove 21C and profiled edge 21G of upper wedge 21.

Figure 3A:
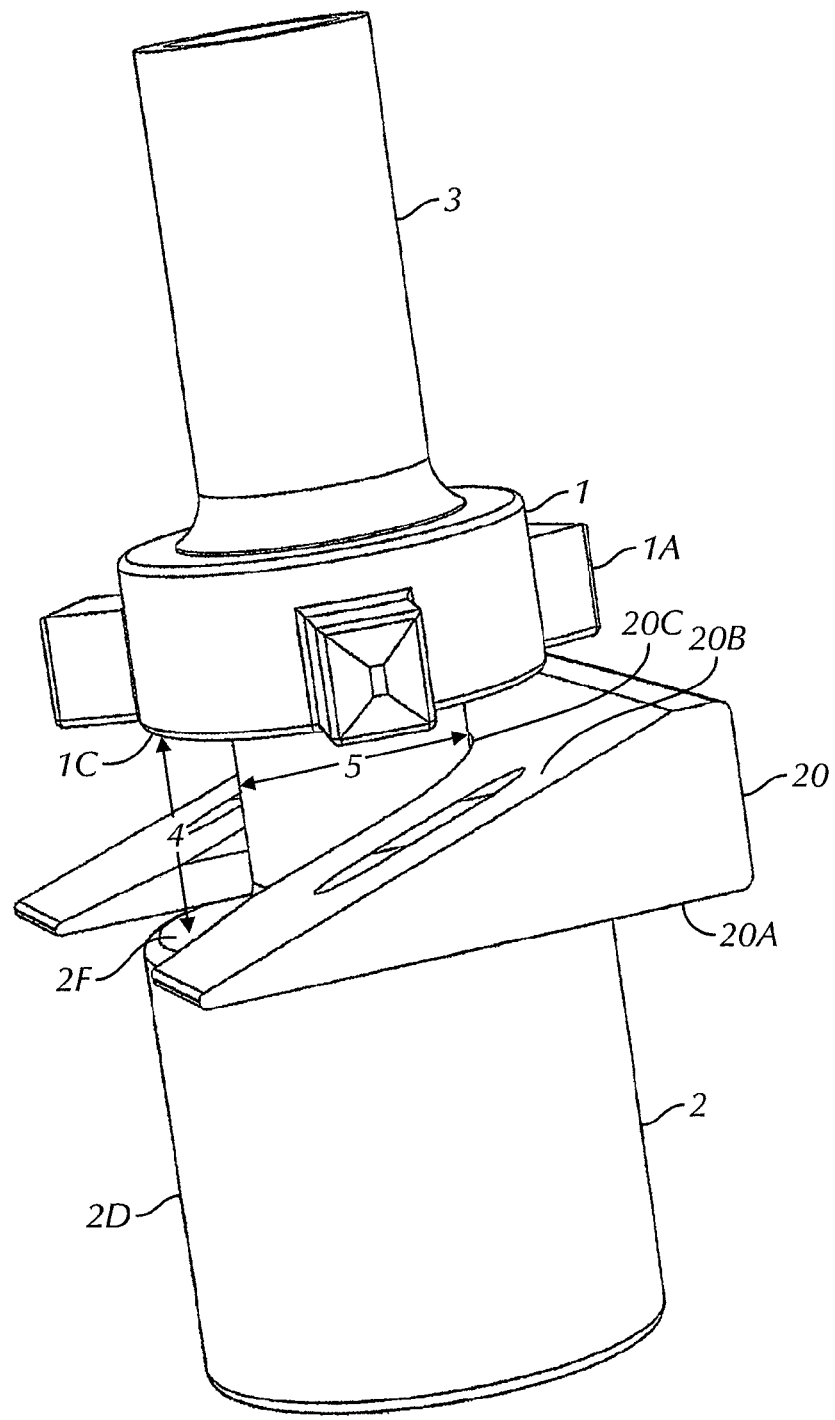
FIGS. 3A-3C show perspective views of a locking mechanism installed on a threaded union in accordance with one or more embodiments of the present disclosure.
Figure 3B:
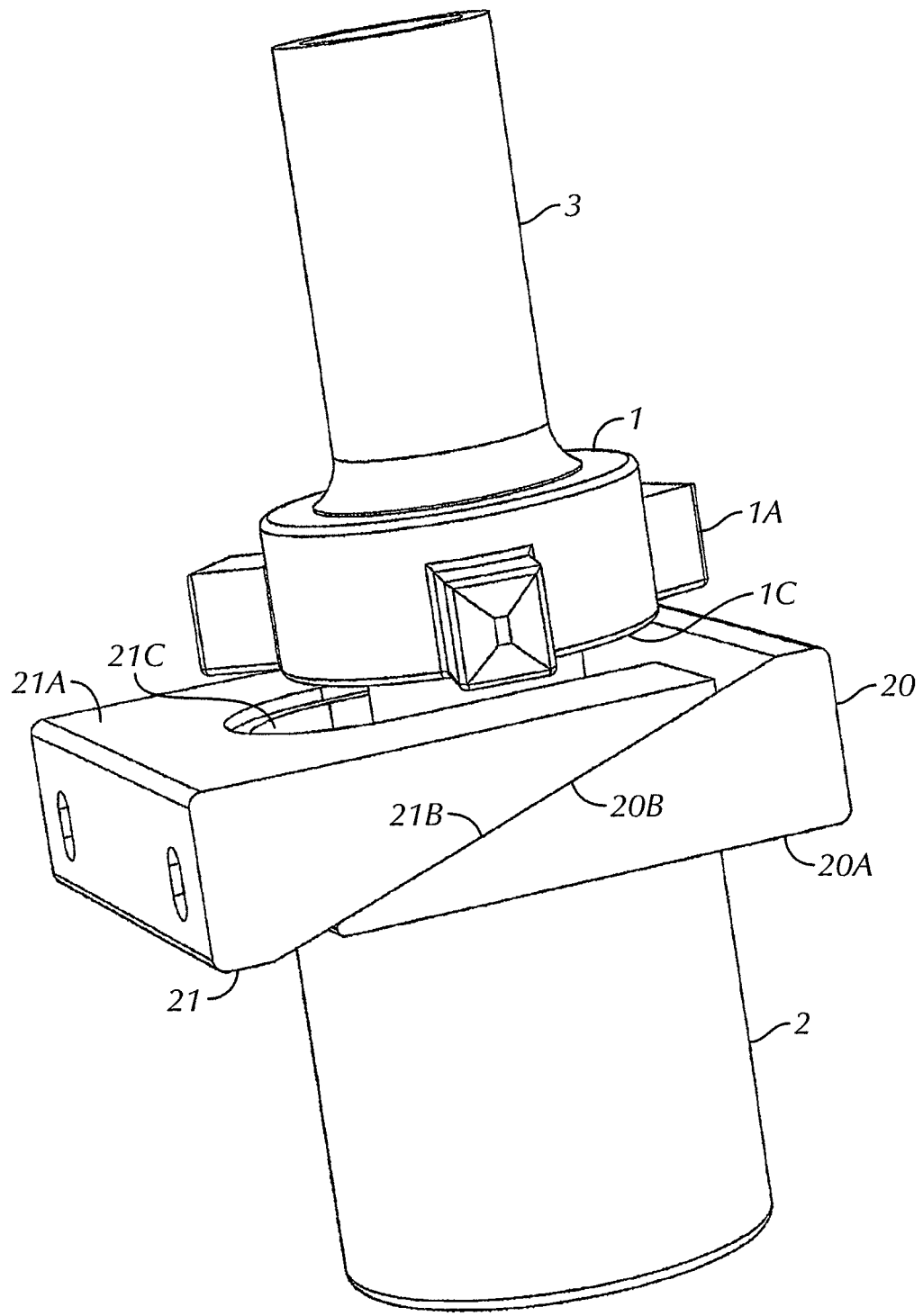
Figure 3C:
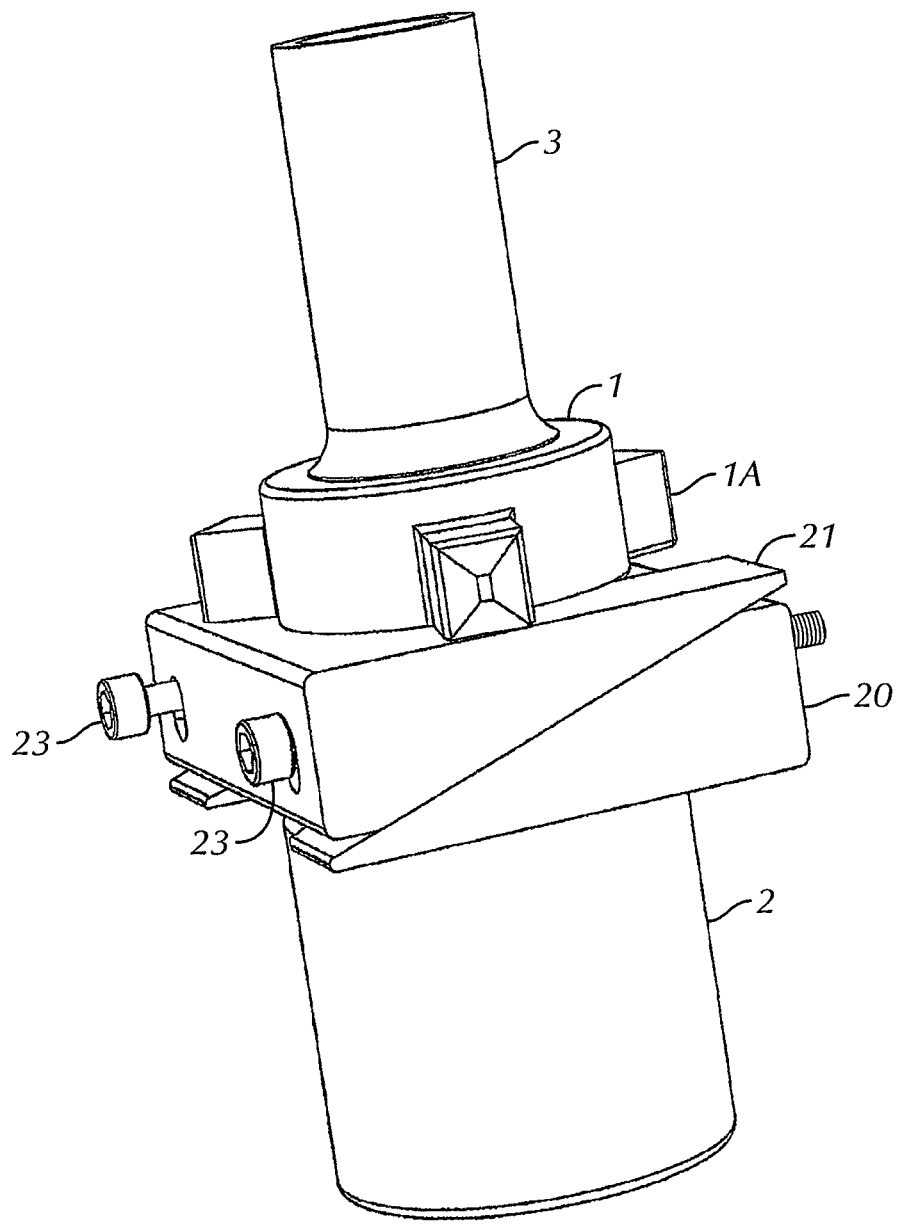

Referring now to FIGS. 3A-3C, perspective views of the locking mechanism as installed onto a threaded union in accordance with one or more embodiments disclosed herein are shown. The made-up threaded union includes a union nut 1 with hammer lugs 1A and a flat surface 1C, shouldered nipple 2 with an external shoulder 2F and outer diameter 5, and a threaded nipple 3. Lower wedge 20 is disposed around shouldered nipple 2 between flat surface 1C of union nut 1 and external shoulder 2F of shouldered nipple 2 such that elongated groove 20C is substantially concentric with outer diameter 5. Lower wedge 20 and upper wedge 21 are mated at inclined surfaces 20B and 21B such that elongated groove 21C may be substantially concentric to outer diameter 5 and horizontal surfaces 20A and 21A are substantially parallel. As shown, lower and upper wedges 20, 21 are disposed within an offset distance 4, which is formed between a lower surface 1C of the union nut 1 and an upper surface 2F of enlarged section 2D. Lower wedge 20 and upper wedge 21 may be urged together by threaded fasteners (including hex headed cap screws, 23), such that horizontal surfaces 20A and 21A bear on external shoulder 2F and flat surface 1C respectively.

In certain embodiments, wedge angles 20F and 21F of lower and upper wedges 20, 21, respectively, may be between about 15 and 21 degrees and lower and upper wedges 20, 21 may be urged together with a total force of between 3,000 and 5,000 lbs force (force applied by mechanical fasteners). In other embodiments, the lower and upper wedges 20, 21 may be urged together until they apply a total force on external shoulder 2F and flat surface 1C (substantially along the axis of the hammer union) of between about 5,000 and 15,000 pounds force. In still further embodiments, wedge angles 20F and 21F of lower and upper wedges 20, 21, respectively, may be about 18 degrees and the lower and upper wedges 20, 21 may be urged together until they apply a substantially axial force of about 9,000 lbs on external shoulder 2F and flat surface 1C.

Lower and upper wedges 20, 21 may be made from a number of materials known in the art. In certain embodiments, lower and upper wedges 20, 21 may be made from an aluminum alloy. In other embodiments, the lower and upper wedges 20, 21 may be made from thermoplastic, for example, high density polyethylene. In certain embodiments, at least one of the wedges may include a resilient material such that when the wedges are urged together, a spring force may exist normal to the horizontal surfaces 20A and 21A. For example, lower wedge 20 may include aluminum with a resilient elastomeric pad (e.g., high durometer rubber or urethane) on horizontal surface 20A. Thus, when the lower and upper wedges 20, 21 are urged together, the resilient elastomeric pad may compress, thereby creating a residual spring force normal to the horizontal surfaces 20A and 21A. In further embodiments, at least one of the wedges includes alternating layers of resilient and non-resilient materials. In still further embodiments, at least one of horizontal surfaces 20A and 21A may include a high friction surface configured to impede rotation of the union nut 1 (FIG. 3A). For example, the high friction surface may include, but is not limited to, an elastomeric surface, an abrasive surface, and a grooved surface.

Figure 4:
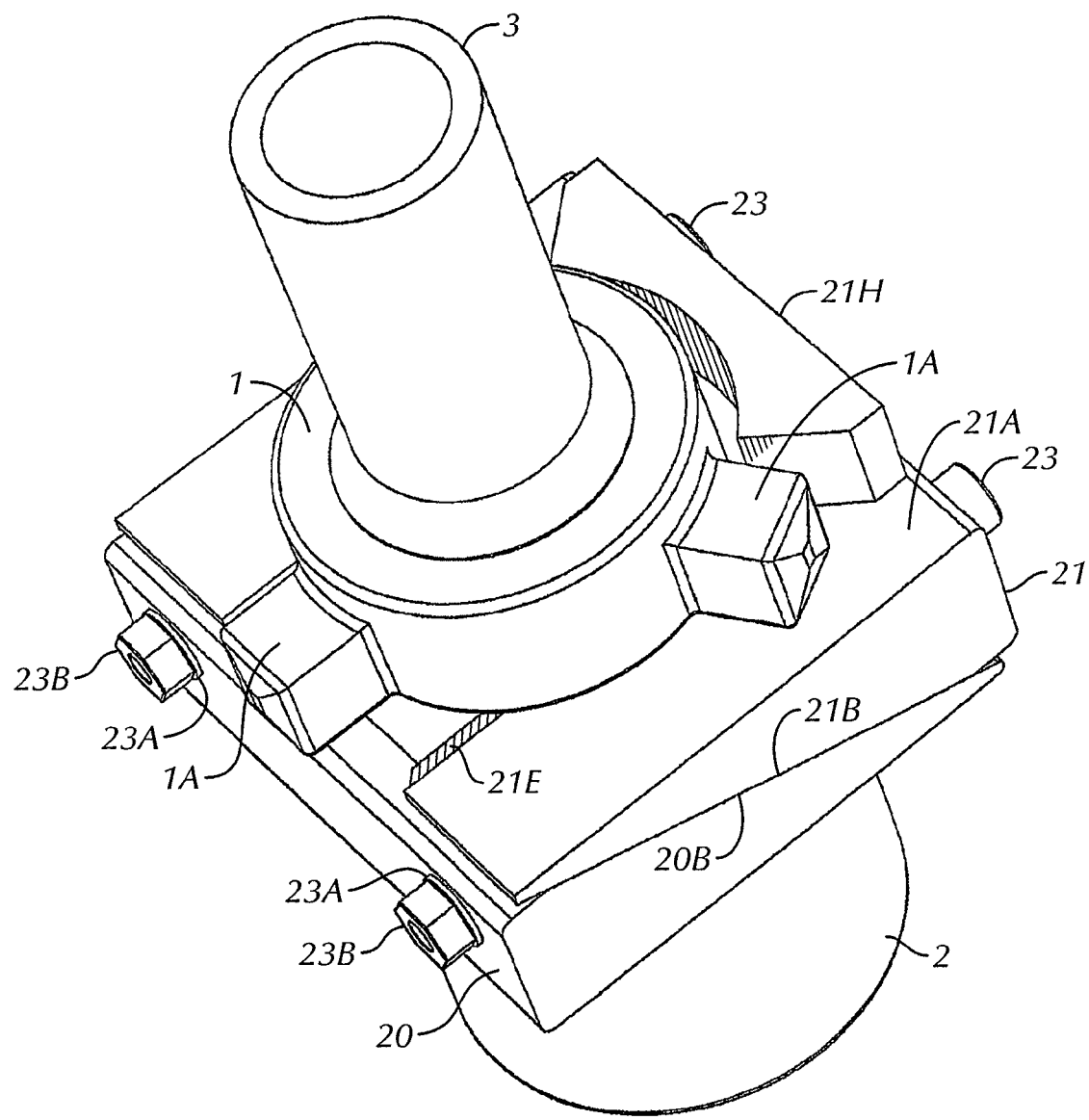
FIG. 4 shows a perspective view of a locking mechanism installed on a threaded union in accordance with one or more embodiments of the present disclosure.

Referring now to FIG. 4, a perspective view of a locking mechanism installed on a threaded union in accordance with one or more embodiments of the present disclosure is shown. Threaded union includes union nut 1 with hammer lugs 1A, shouldered nipple 2, and threaded nipple 3. Lower wedge 20 and upper wedge 21 are mated at inclined surface 20B and 21B and urged together with threaded fasteners, which include cap screws 23, washers 23A and nuts 23B. In certain embodiments, upper wedge 21 may include a lug nub 21H, which protrudes from horizontal surface 21A and may bear on one or more hammer lugs 1A to prevent rotation of union nut 1. Lug nub 21H may be an integral part of upper wedge 21 (as shown), or may be a separate part attached to upper wedge 21 (as with threaded fasteners or by other means known in the art). Nub 21H may be substantially arcuate to conform to union nut 1, or may be other shapes. In certain embodiments, upper wedge 21 may have one or more holes (not shown) drilled and tapped in horizontal surface 21 to accommodate, for example, threaded dowels or similar to serve as lug nubs.

Methods of installing the locking mechanism shown in FIG. 4 onto a made-up threaded union in accordance with embodiments disclosed herein may proceed as follows. The lower wedge 20 and the upper wedge 21 are assembled on the made-up threaded union between the union nut flat surface 1C and a shoulder 2F with mechanical fasteners 23. The assembled wedges may be rotated in the make-up direction (i.e., the direction in which the threaded union nut 1 is rotated for tightening) until one or more nubs 21H (FIG. 4) on horizontal surface of the upper wedge 21 are in contact with a hammer union lug 1A. At this point, the lower and upper wedges 20, 21 may be tightened about the threaded union by urging the wedges together with the mechanical fasteners 23.

Figure 5:
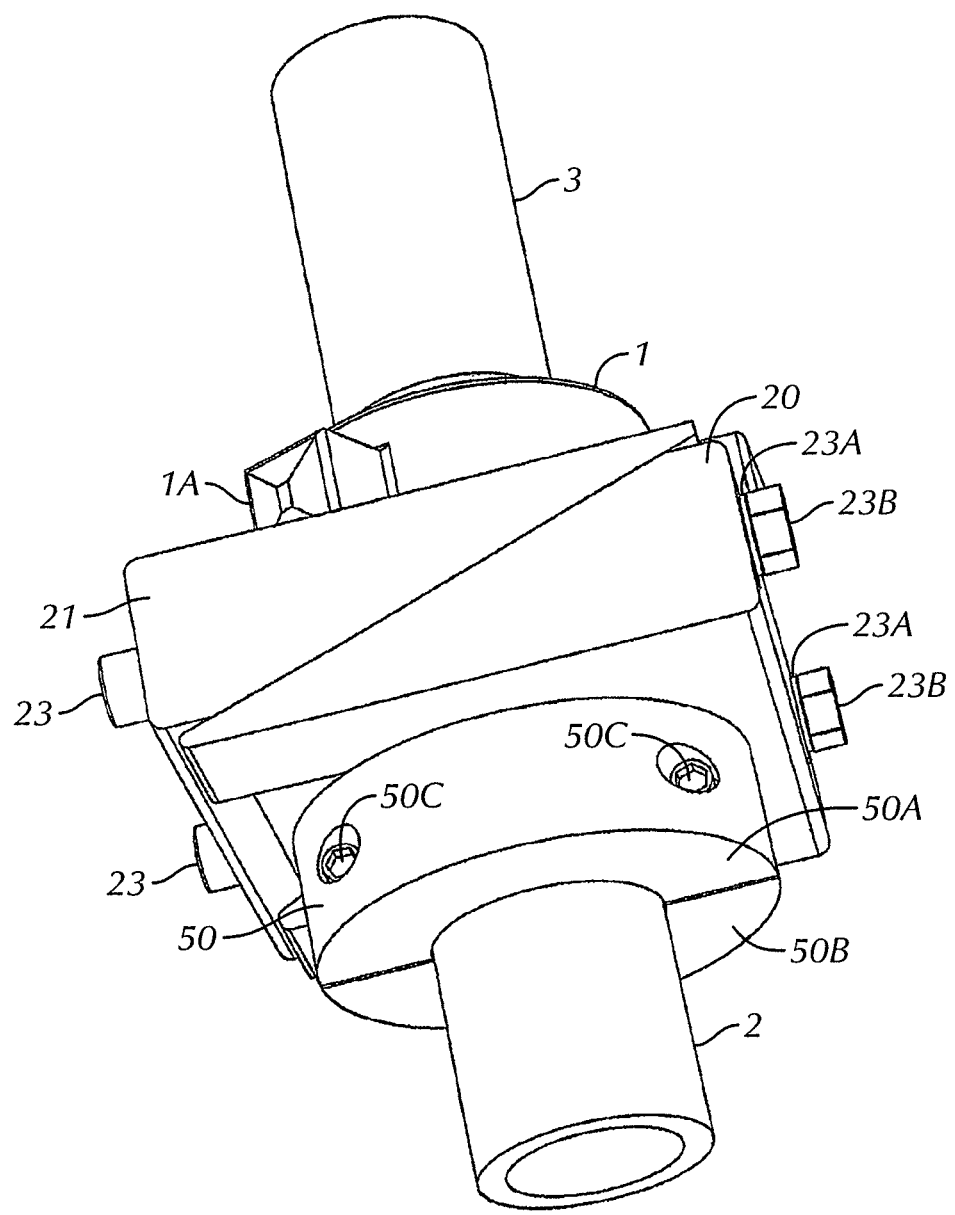
FIG. 5 shows a perspective view of a locking mechanism installed on a threaded union in accordance with one or more embodiments of the present disclosure.

Referring now to FIG. 5, a perspective view of a locking mechanism installed on a threaded union in accordance with one or more embodiments of the present disclosure is shown. Threaded union includes union nut 1 with radial lugs 1A, shouldered nipple 2, and threaded nipple 3. However, in certain instances, the threaded union may not have an external shoulder 2F (shown in FIG. 1B) on shouldered nipple 2 for the wedges to wedge between. Instead, lower and upper wedges 20, 21 may be urged into place by threaded fasteners (comprising cap screws 23, washers 23A and nuts 23B) between union nut 1 and a split collar 50.

Split collar 50 includes half collars 50A and 50B joined together by socket-headed cap screws 50C. Collars of other designs known in the art may be used, including multi section collars or collars which lock circumferentially. In all cases, the selected collar must be capable of resisting the axial thrust imparted by lower wedge 20 and upper wedge 21. In certain embodiments, a shallow groove on shouldered nipple 2 may be fit with a split collar, which fits into the shallow groove. In other embodiments, a small external shoulder on shouldered nipple 2 may be fit with split rings bearing on the small shoulder and a retaining collar which may be placed over the end of the shouldered stub to retain the split rings and to provide a surface to carry the axial thrust imparted by the wedges.

Methods of installation of the locking mechanism shown in FIG. 5 include fitting the threaded union with a split collar 50 located at a known axial distance from the made-up union nut. After the split collar is installed, the lower and upper wedges 20, 21 may be assembled on the made-up threaded union between the union nut 1 and the split collar 50 with mechanical fasteners 23.

Advantageously, embodiments of the present disclosure provide locking mechanism that may be installed onto made-up threaded unions, or hammer unions, to prevent the union nut from backing off over longer periods of use that the threaded union may experience. In addition, the locking mechanism of embodiments disclosed herein may be quickly and easily installed onto the made-up threaded union. The locking mechanism reduces installation time while adding reliability to the threaded union.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A threaded union comprising:
    a threaded union nut configured to couple abutting ends of a threaded nipple on a distal end of a first joint and a shouldered nipple on a distal end of a second joint; and
    a lower wedge and an upper wedge positioned within an offset distance formed between a lower surface of the union nut and an upper surface of an enlarged section of the shouldered nipple.

2. The threaded union of claim 1, further comprising at least one mechanical fastener configured to urge the lower wedge and the upper wedge together.

3. The threaded union of claim 1, wherein at least one of the lower and upper wedges comprises an elongated groove therein having a width slightly larger than a diameter of the shouldered nipple.

4. The threaded union of claim 1, wherein mating inclined surfaces of the lower and upper wedges comprise wedge angles of between about 15 degrees and about 21 degrees.

5. The threaded union of claim 1, wherein mating inclined surface of the lower and upper wedges comprises wedge angles of about 18 degrees.

6. The threaded union of claim 1, wherein the lower and upper wedges comprise aluminum alloy.

7. The threaded union of claim 1, wherein the lower and upper wedges comprise a thermoplastic.

8. The threaded union of claim 1, wherein at least one of the lower and upper wedges comprises a resilient material.

9. The threaded union of claim 1, wherein at least one of the lower and upper wedges comprises a high friction surface.

10. The threaded union of claim 1, wherein one of the upper and lower wedges comprises at least one lug nub protruding upward from a horizontal surface thereof and configured to engage at least one hammer lug of the union nut.

11. The threaded union of claim 1, wherein the shouldered nipple comprises a split collar installed onto the second joint.

12. A locking mechanism for a threaded union, the locking mechanism comprising:

a lower wedge and an upper wedge positioned within an offset distance formed between a lower surface of a union nut and an upper surface of an enlarged section of a shouldered nipple; and at least one mechanical fastener configured to urge the lower wedge and the upper wedge together;

wherein the lower and upper wedges are urged together to create an axial force against the lower surface of the union nut and the upper surface of the enlarged section.

13. The locking mechanism of claim 12, wherein at least one of the lower and upper wedges comprises an elongated groove therein having a width slightly larger than a diameter of the shouldered nipple.

14. The locking mechanism of claim 12, wherein mating inclined surfaces of the lower and upper wedges comprise wedge angles of between about 15 degrees and about 21 degrees.

15. A method to lock a union nut of a threaded union, the method comprising:

threading the union nut over abutting ends of a threaded nipple and a shouldered nipple;

mating a lower wedge with an upper wedge within an offset distance formed between a lower surface of the union nut and an upper surface of an enlarged section of the shouldered nipple;

urging the lower and upper wedges together; and generating axial forces against the lower surface of the union nut and the upper surface of the enlarged section of the shouldered nipple.

16. The method of claim 15, further comprising urging the lower and upper wedges together with at least one mechanical fastener.

17. The method of claim 15, further comprising urging the lower and upper wedges together to apply an axial force against the lower surface of the union nut and the upper surface of the enlarged section of the shouldered nipple of between about 5,000 pounds and about 15,000 pounds.

18. The method of claim 15, further comprising urging the lower and upper wedges together to apply an axial force against the lower surface of the union nut and the upper surface of the enlarged section of the shouldered nipple of about 9,000 pounds.

19. The method of claim 15, further comprising engaging at least one hammer lug of the union nut with at least one lug nub protruding from a horizontal surface of the upper wedge to prevent rotation of the union nut.

20. The method of claim 15, further comprising installing a collar on the shouldered nipple diameter to provide the enlarged section of the shouldered nipple.

21. The method of claim 15, wherein the lower and upper wedges comprise corresponding elongated grooves therein having a width slightly larger than a diameter of the shouldered nipple.

* * * * *